(12) United States Patent  
Guan (10) Patent No.: US 9,462,219 B2  
(45) Date of Patent: Oct. 4, 2016

(54) METHOD FOR REVERSE VIDEO PLAYBACK AND COMPUTER-READABLE MEDIUM

(71) Applicant: VIVOTEK INC., New Taipei (TW)

(72) Inventor: Jian-Nan Guan, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 14/620,545

(22) Filed: Feb. 12, 2015

(65) Prior Publication Data

US 2015/0281633 A1    Oct. 1, 2015

(30) Foreign Application Priority Data

Mar. 26, 2014   (TW) .................................. 103111329

(51) Int. Cl.
```
H04N 5/783      (2006.01)
H04N 19/44      (2014.01)
G11B 27/00      (2006.01)
```
(52) U.S. Cl.
CPC ............. *H04N 5/783* (2013.01); *G11B 27/005* (2013.01); *H04N 19/44* (2014.11)

(58) Field of Classification Search
None
See application file for complete search history.

(56) References Cited

U.S. PATENT DOCUMENTS

2003/0031380 A1*  2/2003  Song .................. G06T 15/00  
                                                    382/284  
2006/0088286 A1*  4/2006  Shibata ............... G11B 27/005  
                                                    386/344

\* cited by examiner

*Primary Examiner* — Eileen Adams  
(74) *Attorney, Agent, or Firm* — Maschoff Brennan

(57) ABSTRACT

A method for reverse video playback and a computer-readable medium are provided for playing a video stream backward. The video stream includes a plurality of groups of pictures which includes a plurality of frames. The frames include one I-frame and at least one frame which is a non-I-frame. The said method includes decoding from the I-frame to a last one frame in a group of pictures according to the time sequence, outputting the last one frame, saving at least one frame which is not outputted in the group of pictures to a storage module, pre-decoding the frames which is not outputted and saved in the group of picture, outputting the frame which is in the storage module.

18 Claims, 7 Drawing Sheets

METHOD FOR REVERSE VIDEO PLAYBACK AND COMPUTER-READABLE MEDIUM

CROSS-REFERENCE TO RELATED APPLICATIONS

This non-provisional application claims priority under 35 U.S.C. §119(a) on Patent Application No. 103111329 filed in Taiwan, R.O.C on Mar. 26, 2014, the entire contents of which are hereby incorporated by reference.

BACKGROUND

1. Technical Field

The present invention relates to a method for reverse video playback and a computer-readable medium, particularly to a method for reverse video playback and a computer-readable medium capable of reducing average image latency time.

2. Description of the Related Art

By now, when important event occurs, such as robbery, car accident, thievery . . . etc, monitoring staffs usually need to access relevant surveillance videos to know the situation. To understand the whole event, repeatedly checking the surveillance videos is required by playing the videos forward and backward repeatedly.

However, there are still many problems when playing a video backward. For example, in traditional techniques of playing a video backward, when outputting the third frame from the last is needed, it needs to decode the frames starting from the I-frame to the third frame from the last in the video stream and outputs the decoded third frame from the last. When outputting the fourth frame from the last is needed, it needs to decode the frames starting from the I-frame to the fourth frame from the last again. When the frame number in the video stream is more than a certain number, the aforementioned method takes lots of time and every time users need to wait for a period of time when playing a video backward.

In addition, in the previous example, when all the decoded frames from the I-frame to the third frame from the last are saved to a cache block in advance, the fourth frame from the last in the video stream can be directly outputted from the cache block, so that the time of sequentially decoding the frames from the I-frame to the fourth frame from the last in the aforementioned method is saved. However, the method needs a cache block with a large capacity. When the frames in the video stream exceed a certain number, the capacity of the cache block and the cost of the cache block for executing the method are considerable.

SUMMARY

A method for reverse video playback for playing a video stream backward is disclosed. The video stream includes a group of pictures and the group of pictures have a plurality of frames, and the plurality of frames include an I-frame and at least one non-I-frame, and the plurality of frames have a time sequence. The method includes decoding from the I-frame to the last frame in the group of pictures according to the time sequence, outputting the last decoded frame, saving the last at least one decoded frame which is not outputted in the group of pictures in a storage module, pre-decoding the frame which is neither outputted nor saved in the group of pictures, outputting the decoded frame in the storage module, and when no decoded frame is in the storage module, outputting the last decoded frame which is neither outputted nor saved in the group of pictures which is pre-decoded and saving the last at least one decoded frame among the left frames in the storage module.

A computer-readable medium having a computer program for a processing module to execute a plurality of instructions to play a video stream backward is disclosed. The video stream includes a group of pictures, and the group of pictures has a plurality of frames, and the plurality of frames include an I-frame and at least one non-I-frame, and the plurality of frames have a time sequence. The plurality of instructions include decoding from the I-frame to the last frame in the group of pictures according to the time sequence, outputting the last decoded frame, saving the last at least one decoded frame which is not outputted in the group of pictures in a storage module, pre-decoding the frame which is neither outputted nor saved in the group of pictures, outputting the decoded frame in the storage module, and when no decoded frame is in the storage module, outputting the last decoded frame which is neither outputted nor saved in the group of pictures which is pre-decoded and saving the last at least one decoded frame among the left frames in the storage module.

The method for reverse video playback reduces and averages the latency time of outputting frames when playing the video backward by saving the pre-decoded frames of part of the video stream to the storage module and pre-decoding part of the frame when inputting a frame every time.

BRIEF DESCRIPTION OF THE DRAWINGS

The present invention will become more fully understood from the detailed description given herein below and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
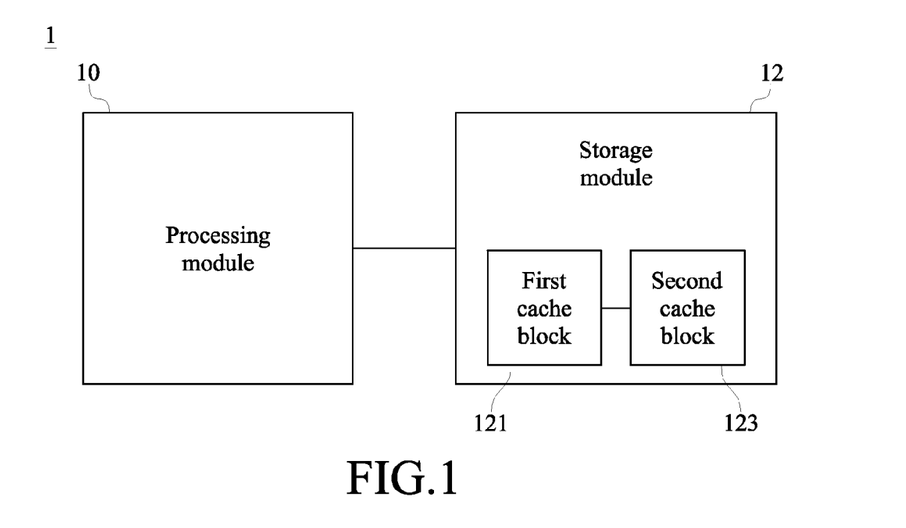
FIG. 1 is a functional block diagram of a device executing the method for reverse video playback according to an embodiment.

Please refer to FIG. 1. FIG. 1 is a functional block diagram of a device executing the method for reverse video playback according to an embodiment. As shown in FIG. 1, the device 1 executing the method for reverse video playback includes a processing module 10 and a storage module 12. The processing module 10 is coupled with the storage module 12.

Figure 2:
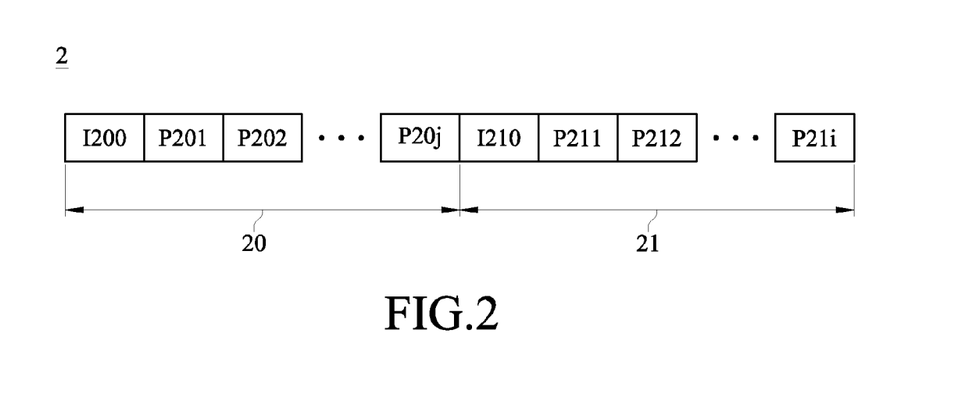
FIG. 2 is a diagram of a video stream according to an embodiment.

Please refer to FIG. 1 and FIG. 2 together. FIG. 2 is a diagram of a video stream according to an embodiment. As shown in FIG. 1 and FIG. 2, the processing module 10 is for executing the method for reverse video playback to play the video stream 2 backward. The details of the method for reverse video playback are specifically explained later.

The video stream 2 includes the groups of pictures 20 and 21 and the groups of pictures 20 and 21 have a plurality of frames respectively. The plurality of frames of the group of pictures 20 include an I-frame I200 and a plurality of non-I-frames, such as the frames P201, P202 . . . P20j. The plurality of frames of the group of pictures 21 include an I-frame I210 and a plurality of non-I-frames, such as the frames P211, P212 . . . P21i. There is a time sequence between each of the aforementioned plurality of frames, such as the time sequence of the frame I200 is earlier than the time sequence of the frame P201, and the time sequence of the frame P201 is earlier than the time sequence of the frame P202, and so on. Moreover, there is also a time sequence between the groups of pictures 20 and 21, that is, the time sequence of the group of pictures 20 is earlier than the time sequence of the group of pictures 21.

The storage module 12 is for temporarily saving the frames which are decoded by the processing module 10 and are not outputted in the video stream 2, so that these frames are able to be directly outputted by the storage module 12 during the next decoding. For example, before outputting the frame P212, the video decoding process must starts from the I-frame I210 to decode the frames I210, P211, and P212 according to the time sequence and then outputs the frame P212. Therefore, when the video decoding process firstly decodes the frame P211 and saves the frame P211 in the storage module 12, the processing module 10 can directly obtain the decoded frame P211 in the storage module 12 during the later process which needs to output the frame P211, so that the image playing latency resulting from frame decoding is reduced. Moreover, the storage module 12 is not limited to be installed outside the processing module 10. In other words, the storage module 12 can be also embedded inside the processing module 12, depending on the hardware structure design of the device or user's needs. The present embodiment is for illustrating but not for limiting the present disclosure.

In addition, in an embodiment, the storage module 12 further includes a first cache block 121 and a second cache block 123. The frames which are decoded by the processing module 10 and are not outputted are saved in the first cache block 121 or the second cache block 123, and the total affordable frame number of the first cache block 121 and second cache block 123 is N. For example, N is 2 of decoded frames, that is, when the first cache block 121 saves N frames which are decoded but are not outputted, the second cache block 123 can not save any frame. The detailed operations of the first cache block 121 and the second cache block 123 are specifically explained later.

Figure 3A:
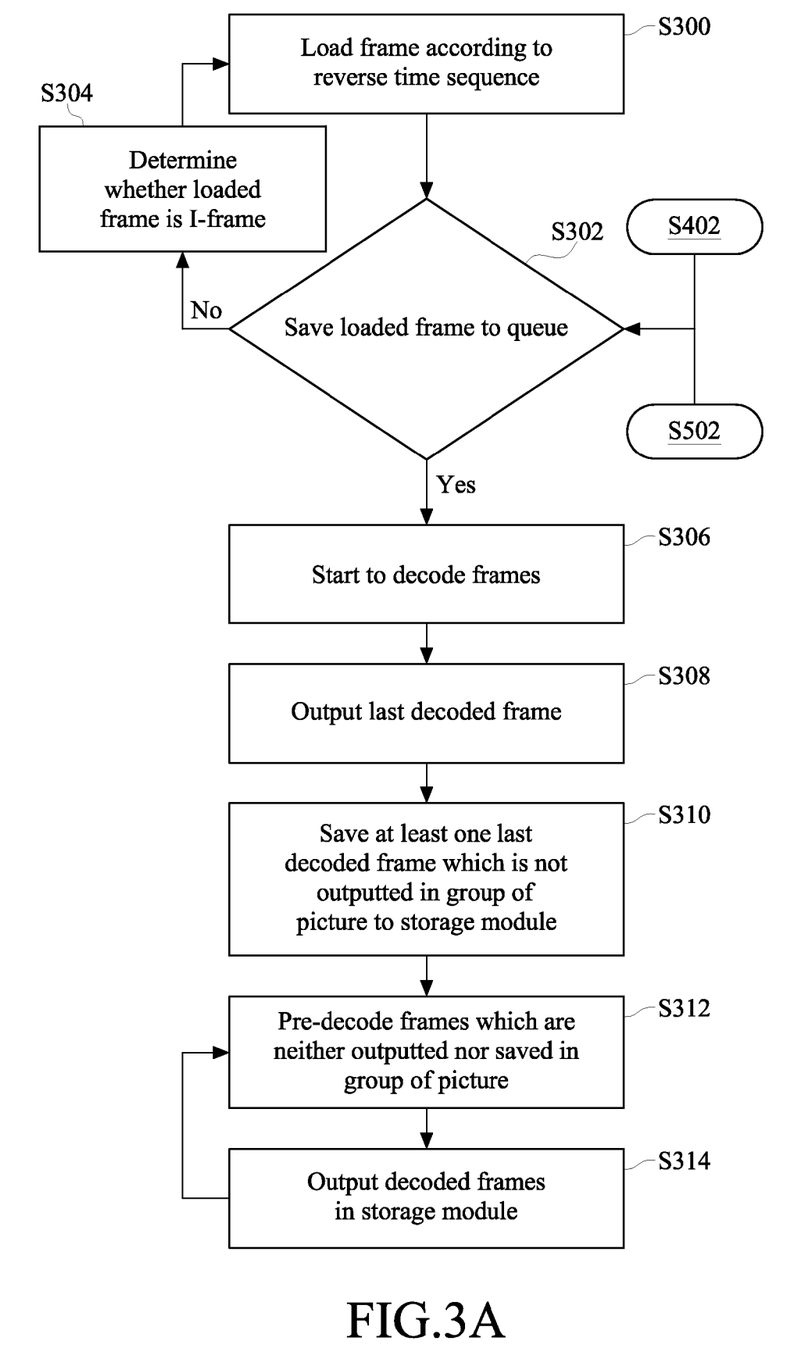
FIG. 3A is a flowchart of the method for reverse video playback according to an embodiment.

Please refer to FIG. 1, FIG. 2, and FIG. 3A together. FIG. 3A is a flowchart of the method for reverse video playback according to an embodiment. As shown in FIG. 1, FIG. 2, and FIG. 3A, in the step S300, a frame in the group of pictures 21 of the video stream 2 is loaded into the processing module 10 in reverse time sequence. In the step S302, the processing module 10 determines whether the received frame is an I-frame. In the step S304, the loaded frame is saved to a queue of a storage unit. The storage unit can be part of the storage module or an independent storage unit. For example, when the user wants to play the video stream 2 backward, the frames in the group of pictures 21 starting from the frame P21i are loaded into the processing module 10 one by one in reverse time sequence, such as the sequence of P21i . . . P212, P211, and I210. When the frame P21i is loaded into the processing module 10, the processing module 10 determines whether the loaded frame P21i is an I-frame. When the frame P21i is not an I-frame, the processing module 10 saves the frame P21i to the queue and receives the next frame. When the frame P211 is loaded into the processing module 10, the processing module 10 determines that the frame P211 is not an I-frame and saves the frame P211 to the queue. When the frame I210 is loaded into the processing module 10, the processing module 10 determines that the frame I210 is an I-frame, so the processing module starts to decode in the step S306.

In the step S306, the processing module 10 starts to decode. When the processing module 10 determines that the loaded frame I210 is an I-frame, the processing module 10 starts to decode the frames I210, P211, P212 . . . P21i in the group of pictures 21 including the I-frame. The processing module 10 rearranges the frames belonging to the group of pictures 21 and saved in the queue according to the time sequence, and starts to decode from the I-frame I210 to the last frame P21i in the group of pictures 21 according to the time sequence. In the step S308, the last decoded frame P21i is outputted. In the step S310, at least one decoded frame which is not outputted in the group of pictures 21 is saved to the storage module 12. For example, when the frame number available for saving of the storage module 12 is 2, the last frame and the second frame from the last in the group of pictures 21 except the outputted frame P21i are saved to the storage module 12. In the step S312, the frames which are neither outputted and nor saved in the group of pictures 21 are pre-decoded, that is, in the previous example, the frames started from the I-frame I210 to a indicated frame in the group of pictures 21 are decoded again. When decoding to the indicated frame, the step S314 is executed. In the step S314, the decoded frames in the storage module 12 are outputted.

It is worth mentioning that the step S312 is executed again after the step S314 is executed. In the previous example, when the pre-decoding process reaches the indicated frames in the step S312, the decoded frames in the storage module 12 are outputted in the step S314, and the pre-decoding process starts from the aforementioned indicated frame to the next indicated frame in the step S312, and the decoded frames in the storage module 12 are outputted again in the step S314 until the frames in the group of pictures 21 are all decoded or there is no decoded frames in the storage module 12.

In order to make persons skilled in the art understand the method for reverse video playback more clearly, an embodiment in Table 1 is explained as follows. Please refer to FIG. 3A together. In Table 1, the group of pictures 21 has 15 frames including an I-frame I210 and 14 non-I-frames P211, P212, P213 . . . P2114. Because the time sequence of the frame P2114 is later than the frames I210, P211, P212, P213 . . . P2113, the frames starting from P2114 are loaded into the processing module 10 in reverse time sequence, such as the time sequence of P2114 . . . P212, P211 and I210.

When loading the frames P2114 . . . P213, P212, P211, because the frames P2114 . . . P213, P212, P211 are not I-frames, the processing module 10 saves the inputted frames P2114 ... P213, P212, P211 to the queue. Until the frame I210 is loaded, because the frame I210 is an I-frame, the processing module 10 starts to decode the frames in the group of pictures 21 starting from I210 according to the time sequence. The last decoded frame P2114 in the group of pictures 21 is outputted and because the number of the saved frames in the storage module 12 is 2, the processing module 10 saves the decoded frame P2112, P2113 which are not outputted to the storage module 12. The procedure of the method for reverse video playback after loading the frame I200 is identical to the procedure of loading the frame I210 and is not further explained hereinafter.

Figure 3B:
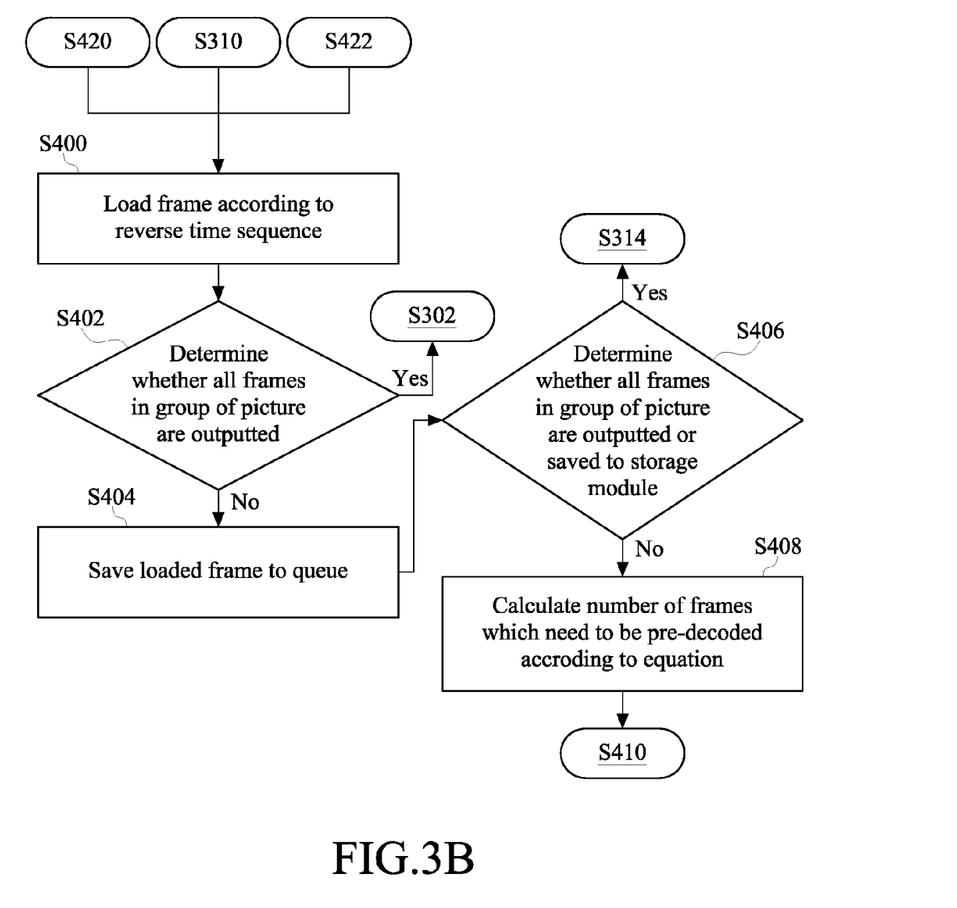
FIG. 3B is a partial flowchart of the method for reverse video playback according to an embodiment.

Next, please refer to FIG. 1, FIG. 3A, and FIG. 3B together. FIG. 3B is a partial flowchart of the method for reverse video playback according to an embodiment. FIG. 3B is a partial embodiment of the step S312 in FIG. 3A. In the step S400, a frame is loaded in reverse time sequence. Because in the step S300, the previously loaded frame is the frame I210 in reverse time sequence, the loaded frame in reverse time sequence in the step S400 is the frame P20j in the group of pictures 20. In the step S402, the processing module 10 determines whether the frames in the group of pictures 21 are all outputted. When the processing module 10 determines that the frames in the group of pictures 21 are all outputted, the processing module 10 goes back to the step S302 and determines whether the loaded frame in the group of pictures 20 is an I-frame. In the step S404, when the processing module 10 determines that the frames in the group of pictures 21 are not all outputted, the loaded frame such as the frame P20j in the group of pictures 20 is saved to the queue. It is worth mentioning that every time when a frame is loaded in reverse time sequence, the method for reverse video playback in an embodiment is executed. For example, when the frame P202 is loaded, the method for reverse video playback is executed, and when the frame P201 is loaded, the method for reverse video playback is executed again, and so on.

In the step S406, the processing module 10 determines whether the frames I210, P211, P212 ... P21i in the group of pictures 21 are all outputted or saved to the storage module 12. In the step S408, when the processing module 10 determines that there are still frames which are not outputted or saved to the storage module 12 among the frames I210, P211, P212 ... P21i in the group of pictures 21, the number of frames which need to be pre-decoded is calculated among the frames which are neither outputted nor saved in the group of pictures 21, wherein the number of frames i which need to be pre-decoded is calculated according to an equation as follows:

$$i = \frac{A}{(B+1)}$$

wherein A stands for the number of frames which are neither outputted, saved, nor pre-decoded in the group of picture, and B stands for the number of decoded frames saved in the storage module, and both A and B are natural numbers including 0.

Figure 3C:
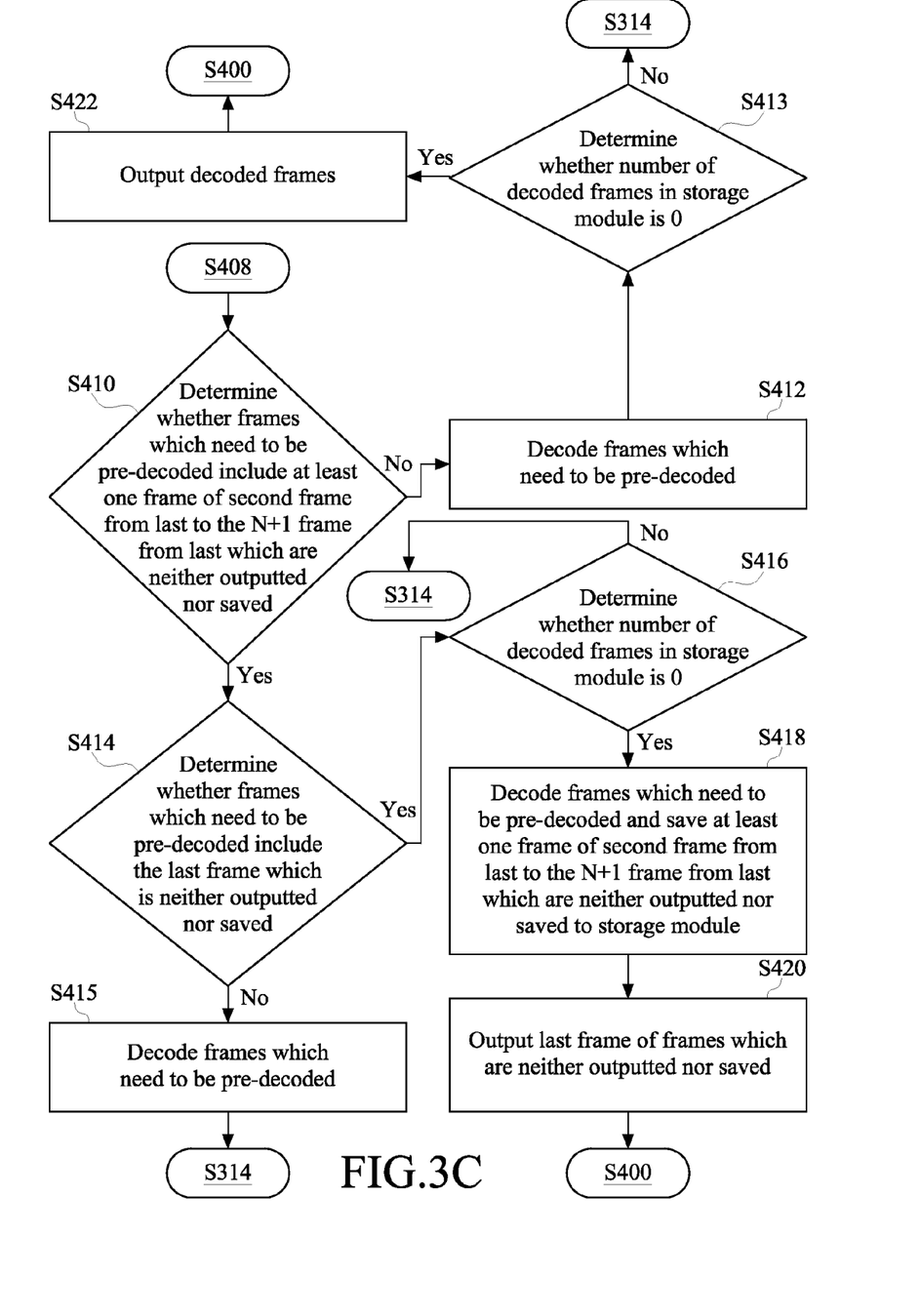
FIG. 3C is a partial flowchart of the method for reverse video playback according to an embodiment.

Next, please refer to FIG. 1, FIG. 3A, FIG. 3B, and FIG. 3C together. FIG. 3C is a partial flowchart of the method for reverse video playback according to an embodiment. FIG. 3C is a partial embodiment of the step S312 in FIG. 3A. In the step S410, the processing module 10 determines whether the frames which need to be pre-decoded include at least one frame of the second frame from the last to the N+1 frame from the last which are neither outputted nor saved in the group of pictures 21. In other words, in the step S410, whether the frames which need to be pre-decoded need to be saved in the storage module 12 is determined. In the step S412, when the processing module 10 determines that the frames which need to be pre-decoded do not include the at least one frame of the second frame from the last to the N+1 frame from the last which are neither outputted nor saved in the group of pictures 21, the frames which need to be pre-decoded are decoded. In the step S413, after the processing module 10 decodes the frames which need to be pre-decoded, the processing module 10 determines whether the number of decoded frames in the storage module 12 is zero. When the processing module 10 determines that the number of decoded frames in the storage module 12 is not zero, the frame with the latest time sequence in the storage module 12 is outputted in the step S314. In the step S422, when the processing module 10 determines that the number of decoded frames in the storage module 12 is zero, the decoded frames are outputted and the step S400 is executed again.

The aforementioned steps are further explained with Table 1 hereinafter. Please refer to FIG. 1, FIG. 3A, FIG. 3B, and FIG. 3C together. In Table 1, the group of pictures 20 has 15 frames including an I-frame I200 and 14 non-I-frames P201, P202 ... P2014. When inputting the frame P2014 to the processing module 10 in the step S400, the processing module 10 determines whether the frames I210, P211, P212 ... P2114 in the group of pictures 21 are all outputted in the step S402. Because the frames in the group of pictures 21 are not all outputted, the processing module 10 saves the frame P2014 to the queue in the step S404. Next, the processing module 10 determines whether the frames I210, P211, P212 ... P2114 in the group of pictures 21 are all outputted or saved to the storage module 12 in the step S406. Because in the previous embodiment, only the frame P2114 is outputted and the frames P2112, P2113 are saved to the storage module 12, the processing module 10 starts to calculate the number of frames i which need to be pre-decoded among the frames I210, P211, P212 ... P2111 which are neither outputted nor saved in the group of pictures 21 in the step S408. According to the aforementioned equation, i=4 because of A=12, B=2, i=A/(B+1)=4.

After the processing module 10 obtains the frames which need to be pre-decoded, the processing module 10 further determines whether the frames which need to be pre-decoded, that is, the frames I210 to P213, include the frames which need to be saved to the storage module 12 in the step S410. Currently, the frames I210 to P213 do not need to be saved to the storage module 12, and the number of the decoded frames in the storage module 12 is not zero, so the processing module 10 decodes the frames I210 to P213 and outputs the latest decoded frame P2113 of the time sequence in the storage module in the step S412, S413, and S314. The procedure of the method for reverse video playback after loading the frames P2013, P2011, P2010, and P208 is identical to the procedure of loading the frame P2014 and is not further explained hereinafter.

In the step S414, the processing module 10 determines whether the frames which need to be pre-decoded include the last frame of the frames which are neither outputted nor saved in the group of pictures 21. Specifically, the processing module 10 further determines whether the frames which need to be pre-decoded include the frames which need to be outputted after the decoding. In the step S415, when the processing module 10 determines that the frames which need to be pre-decoded do not include the frames which need to be outputted after the decoding, the frames which need to be pre-decoded are decoded. After the pre-decoding, the step S314 is executed and the decoded frames in the storage module 12 are outputted.

In the step S416, the processing module 10 determines whether the number of the decoded frames in the storage module 12 is zero. When the number of the decoded frames in the storage module 12 is not zero, the decoded frames in the storage module 12 are outputted in the step S314. In the step S418, when the processing module 10 determines that there is no decoded frames in the storage module 12, the processing module 10 decodes the frames which need to be pre-decoded and saves at least one decoded frame of the second frame from the last to the N+1 frame from the last which are neither outputted nor saved in the group of pictures 21 to the storage module 12. In the step S420, the processing module 10 outputs the last decoded frame among the frames which are neither outputted nor saved.

The aforementioned steps are further explained with Table 1 hereinafter. When loading the frame P2012, because the frames I210, P211 . . . P217 in the group of pictures 21 are all pre-decoded, the left frames P218, P219, P2110, P2111 are exactly the 4 frames which need to be pre-decoded according to the equation, and the frames which need to be pre-decoded include both the frames P219, P2110 which need to be saved to the storage module 12 among the frames which are neither outputted nor saved in the group of pictures 21 in the step S410 and the last frame P2011 in the step S414. At this time, there is no decoded frames in the storage module 12 in the step S416, so the processing module 10 decodes the frames P218, P219, P2110, P2111 which need to be pre-decoded and saves the frames P219, P2110 which need to be saved to the storage module 12 to the storage module 12 in the step S418, and outputs the last decoded frame P2111 in the step S420. After the previous steps, the step S400 is executed again. The procedure of the method for reverse video playback after loading the frames P209, P206, P204 is identical to the procedure of loading the frame P2012 and is not further explained hereinafter.

When loading the frame P207, because the frames I210, P211 in the group of pictures 21 are pre-decoded, the left frames are P212, P213, P214, and P215. According to the equation, the frames which need to be pre-decoded are 2 because of A=4, B=1, i=A/(B+1)=2, and the two frames are the frames P212, P213. At this time, that the frames which need to be pre-decoded include the frame P213 which need to be saved in the storage module 12 is determined in the step S410, and that the frames which need to be pre-decoded do not include the last frame P215 which is neither outputted nor saved is determined in the step S414. Therefore, the processing module 10 decodes the frames which need to be pre-decoded in the step S415 and outputs the decoded frame P216 in the storage module 12 in the step S314. The procedure of the method for reverse video playback after loading the frames P205, P203 is identical to the procedure of loading the frame P207 and is not further explained hereinafter.

When loading the frame P202, because the frame I210 in the group of pictures 21 is pre-decoded, the left frame is the frame P211 is exactly the 1 frame which needs to be pre-decoded according to the equation: A=1, B=0, i=A/(B+1)=1. At this time, the processing module 10 determines that the frames which need to be pre-decoded do not include at least one frame of the second frame from the last to the N+1 frame from the last which are neither outputted nor saved, so the processing module 10 decodes the frame P211 which needs to be pre-decoded in the step S412. After decoding the frame P211, the processing module 10 determines that the number of decoded frames in the storage module 12 is zero in the step S413 and outputs the decoded frame P211. The procedure of the method for reverse video playback after loading the frames P201 is identical to the procedure of loading the frame P202 and is not further explained hereinafter.

Figure 3D:
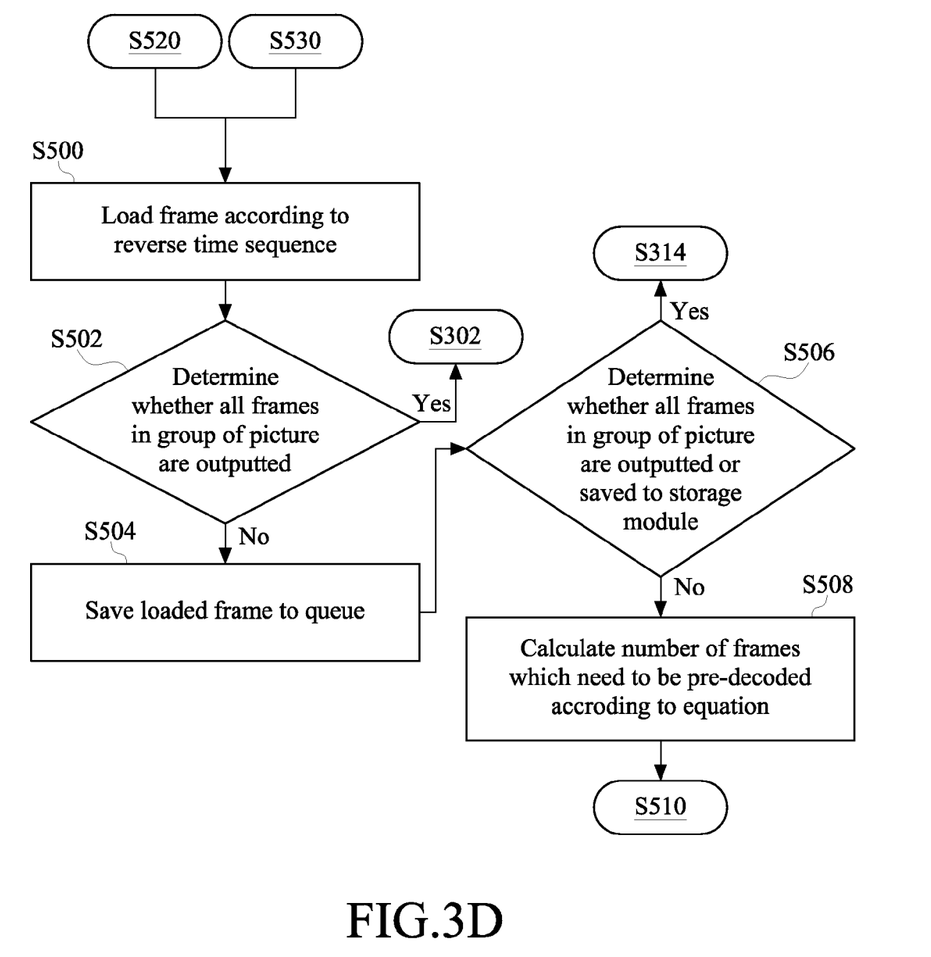
FIG. 3D is a partial flowchart of the method for reverse video playback according to another embodiment.

Next, please refer to FIG. 1, FIG. 3A, and FIG. 3D. FIG. 3D is a partial flowchart of the method for reverse video playback according to another embodiment. FIG. 3D is another partial embodiment of the step S312 in FIG. 3A. The following explanation is described with another embodiment in Table 2. The frame type and frame number of the group of pictures 21 and the group of pictures 20 in Table 2 are identical to the frame type and frame number of the group of pictures 21 and the group of pictures 20 in Table 1. In addition, the method for reverse video playback during loading the frames P2114 . . . P213, P212, and P211 is identical to the embodiment of the method for reverse video playback in Table 1. The difference between the present embodiment and the previous embodiment is that the storage module 12 includes a first cache block 121 and a second cache block 123 in the present embodiment, so the processing module 10 saves the decoded frames which are not outputted to the first cache block 121 or the second cache block 123.

When loading the frame I210, because the frame I210 is an I-frame, the processing module 10 decodes the frames starting from the frame I210 in the group of pictures 21 according to the time sequence, and outputs the last decoded frame P2114 in the group of pictures 21. In the present embodiment, the capacity of the storage module 12 is 2 decoded frames and the processing module 10 saves the last two decoded frames P2112 and P2113 which are not outputted in the group of pictures 21 to the first cache block 121 of the storage module 12. The procedure of the method for reverse video playback after loading the frames I200 is identical to the procedure of loading the frame I210 and is not further explained hereinafter.

Figure 3E:
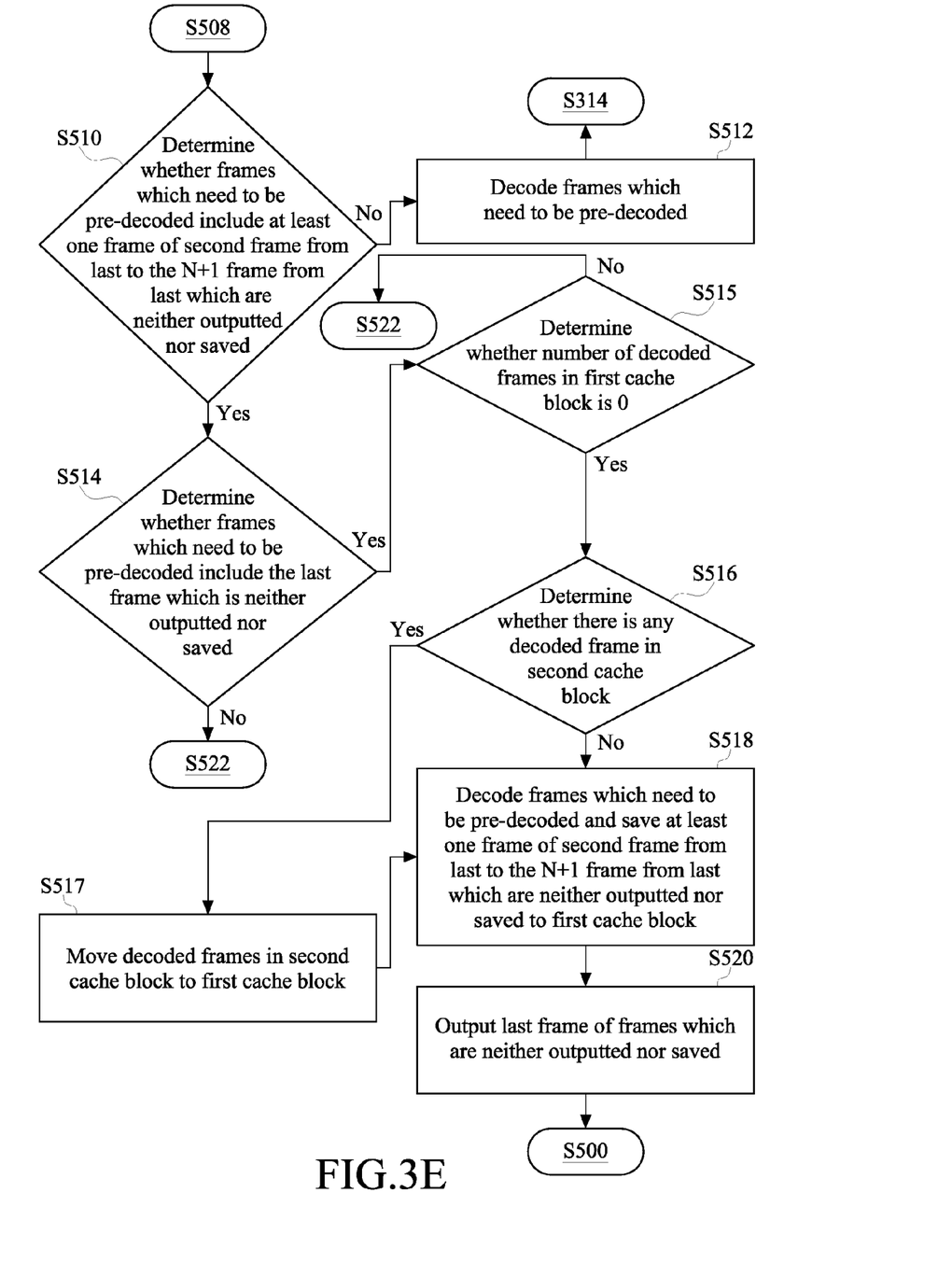
FIG. 3E is a partial flowchart of the method for reverse video playback according to another embodiment.

Next, please refer to FIG. 1, FIG. 3A, FIG. 3D, and FIG. 3E. FIG. 3E is a partial flowchart of the method for reverse video playback according to another embodiment. FIG. 3E is another partial embodiment of the step S312 in FIG. 3A. In the step S500, a frame is loaded in reverse time sequence. In the step S502, the processing module 10 determines whether the frames in the group of pictures 21 are all outputted. When the frames in the group of pictures 21 are all outputted, the processing module 10 goes back to the step S302 and determines whether the loaded frame is an I-frame. In the step S504, when the processing module 10 determines that the frames in the group of pictures 21 are not all outputted, the loaded frames, such as the frame P20j in the group of pictures 20, are saved to the queue. It is worth mentioning that in the step S500, every time when a frame is loaded in reverse time sequence, the method for reverse video playback in another embodiment is executed. For example, when the frame P202 is loaded, the method for reverse video playback in another embodiment is executed, and when the frame P201 is loaded, the method for reverse video playback in another embodiment is executed again, and so on.

In the step S506, the processing module 10 determines whether the frames I210, P211, P212 . . . P21i in the group of pictures 21 are outputted or saved to the storage module 12. In the step S508, when the processing module 10 determines that there are still frames which are not outputted or saved to the storage module 12 among the frames I210, P211, P212 . . . P21i in the group of pictures 21, the processing module 10 starts to calculate the number of frames which need to be pre-decoded among the frame which are not outputted or saved in the group of pictures 21, wherein the frame number i which need to be pre-decoded is calculated according to the following equation:

$$i = \frac{A}{(B+1)}$$

wherein A stands for the number of frames which are neither outputted, saved, nor pre-decoded in the group of picture 21, and B stands for the number of decoded frames saved in the first cache block 121, and both A and B are natural numbers including 0.

In the step S510, the processing module 10 determines whether the frames which need to be pre-decoded include the at least one frame of the second frame from the last to the N+1 frame from the last which are neither outputted nor saved in the group of pictures 21. In other words, in the step S510, whether the frames which need to be pre-decoded include the frames which need to be saved to the storage module 12 after decoding is determined. In the step S512, when the processing module 10 determines that the frames which need to be pre-decoded do not include the at least one frame of the second frame from the last to the N+1 frame from the last which are neither outputted nor saved in the group of pictures 21, the frames which need to be pre-decoded are decoded, and the decoded frame with the latest time sequence in the storage module 12 is outputted in the step S314.

The aforementioned steps are further explained with Table 2 hereinafter. When inputting the frame P2014 to the processing module 10 in the step S500, the processing module 10 determines whether the frames I210, P211, P212 . . . P2114 in the group of pictures 21 are all outputted in the step S502. Because the frames in the group of pictures 21 are not all outputted, the processing module 10 saves the frame P2014 to the queue in the step S504. Next, the processing module 10 determines whether the frames I210, P211, P212 . . . P2114 in the group of pictures 21 are all outputted or saved to the storage module 12 in the step S506. Because in the previous embodiment, only the frame P2114 is outputted and the frames P2112, P2113 are saved to the first cache block 121 of the storage module 12, the processing module 10 starts to calculate the number of frames i which need to be pre-decoded among the frames I210, P211, P212 . . . P2111 which are neither outputted nor saved in the group of pictures 21 in the step S508. According to the aforementioned equation, i=4 because of A=12, B=2, i=A/(B+1)=4.

After the processing module 10 obtains the frames which need to be pre-decoded, the processing module 10 further determines whether the frames which need to be pre-decoded, that is, the frames I210 to P213, include the frames which need to be saved to the storage module 12, like the step S510. Currently, the frames I210 to P213 do not need to be saved to the storage module 12, so the processing module 10 decodes the frames I210 to P213 and outputs the latest decoded frame P2113 in the time sequence in the storage module according to the step S512 and S314. The procedure of the method for reverse video playback after loading the frames P2013, P2011, P2010, and P208 is identical to the procedure of loading the frame P2014 and is not further explained hereinafter.

Figure 3F:
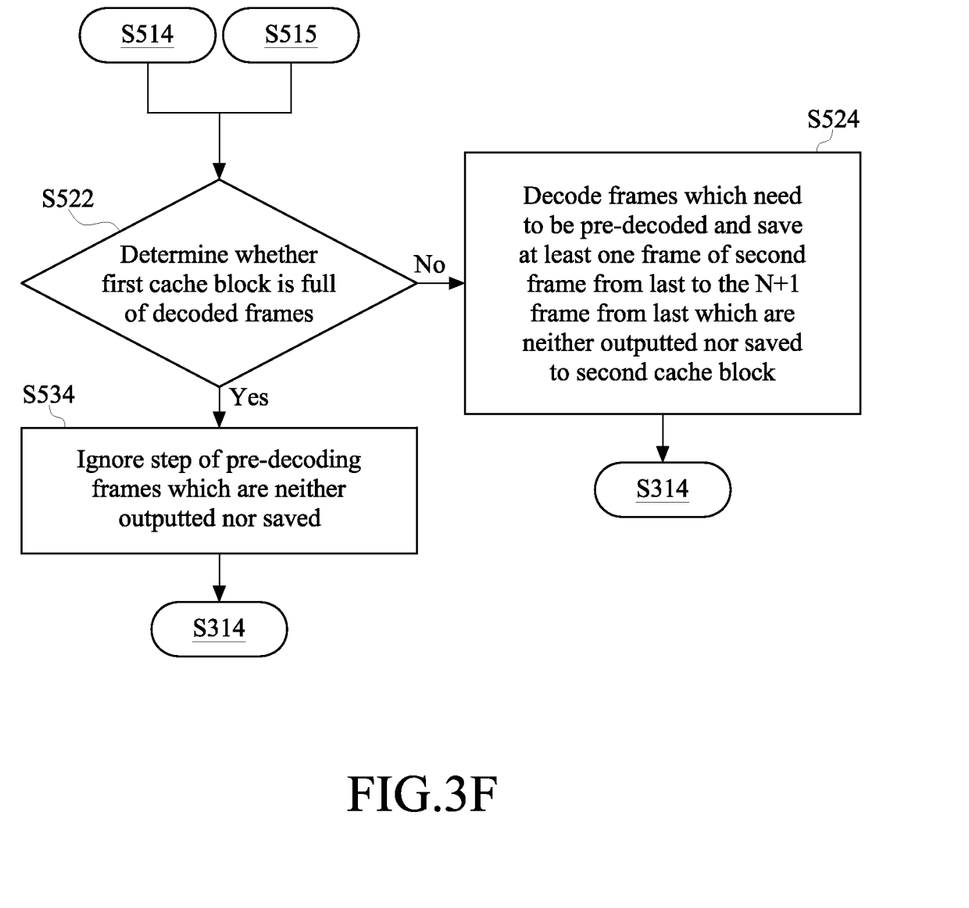
FIG. 3F is a partial flowchart of the method for reverse video playback according to another embodiment.

In the step S514, the processing module 10 determines whether the frames which need to be pre-decoded include the last frame of the frames which are neither outputted nor saved in the group of pictures 21. In the step S515, the processing module 10 determines whether the number of decoded frames in the first cache block 121 of the storage module 12 is zero. When the processing module 10 determines that there are still decoded frames in the first cache block 121, the step S522 is executed. The details of the step S522 and the following steps are specifically explained hereinafter. Specifically, when there are frames which need to be saved to the storage module 12, the processing module 10 saves the frames to the first cache block 121 preferentially. Therefore, in this step, the processing module 10 preferentially determines whether there are still decoded frames in the first cache block 121. If yes, the step S522 is executed. In the step S516, when the processing module 10 determines that the number of the decoded frames in the first cache block 121 is zero, the processing module 10 continually determines whether there are decoded frames in the second cache block 123. In the step S517, when the processing module 10 determines that there are decoded frames in the second cache block 123, the decoded frames in the second cache block 123 are moved to the first cache block 121. In the step S518, when the processing module 10 determines that there is no decoded frames in both the first cache block 121 and the second cache block 123, or the decoded frames in the second cache block 123 are moved to the first cache block 121 by the processing module 10, the processing module 10 decodes the frames which need to be pre-decoded and saves at least one decoded frame of the second frame from the last to the N+1 frame from the last which are neither outputted nor saved in the group of pictures 21 to the first cache block 121. In the step S520, the processing module 10 outputs the last decoded frame among the frames which are neither outputted nor saved, and executes the step S500 again.

The aforementioned steps are further explained with Table 2 hereinafter. When loading the frame P2012, because the frames I210, P211 . . . P217 in the group of pictures 21 are all pre-decoded, the left frames P218, P219, P2110, P2111 are exactly the 4 frames which need to be pre-decoded according to the equation, and the frames which need to be pre-decoded include both the frames P219, P2110 which need to be saved to the storage module 12 among the frames which are neither outputted nor saved in the group of pictures 21 in the step S510 and the last frame P2111 in the step S514. At this time, when there is no decoded frames in the first cache block 121 in the step S515 and there is no decoded frames in the second cache block 123 in the step S516, the processing module 10 decodes the frames P218, P219, P2110, P2111 which need to be pre-decoded and saves the frames P219, P2110 which need to be saved to the storage module 12 to the first cache block 121 in the step S518, and outputs the last decoded frame P2111 in the step S520. The procedure of the method for reverse video playback after loading the frames P209 is identical to the procedure of loading the frame P2012 and is not further explained hereinafter. Similarly, the aforementioned steps are further explained with Table 2 hereinafter.

When loading the frame P206, according to the aforementioned equation, the number of frames i which need to be pre-decoded is 2, and the frames I210, P211, P212, P213 in the group of pictures 21 are pre-decoded at previous time. Therefore, at this time, the frames which need to be pre-decoded are the frames P214 and P215 which are neither outputted nor saved in the group of pictures 21. Because the frame P214 is the frame which need to be saved in the storage module in the step S510, and the frame P215 is the last frame among the frames which are neither outputted nor saved in the step S514, when the processing module 10 determines that the number of decoded frames in the first cache block 121 is zero in the step S515, the processing module 10 continually determines whether there is any decoded frame in the second cache block 123. Because there is a frame P213 in the second cache block 123, the processing module 10 moves the frame P213 in the second cache block 123 to the first cache block 121 in the step S517. Then, according to the aforementioned conditions, the processing module 10 decodes the frames which need to be pre-decoded and saves the frame P214 which need to be saved to the storage module 12 to the first cache block 121, and the processing module 10 outputs the last frame P215 among the frames which are neither outputted nor saved in the step S520. The procedure of the method for reverse video playback after loading the frames P203 is identical to the procedure of loading the frame P206 and is not further explained hereinafter.

Please refer to FIG. 1, FIG. 3A, FIG. 3D, FIG. 3E, and FIG. 3F. FIG. 3F is a partial flowchart of the method for reverse video playback according to another embodiment. FIG. 3F is another partial embodiment of the step S312 in FIG. 3A. In the step S522, when the processing module 10 determines that the frames which need to be pre-decoded do not include the last frames among the frames which are neither outputted nor saved in the group of pictures 21, or when the processing module 10 determines that the frames which need to be pre-decoded include the last frame among the frames which are neither outputted nor saved in the group of pictures 21 and there are still decoded frames in the first cache block 121, the processing module 10 further determines whether the first cache block 121 is full of decoded frames. In the step S524, when the processing module 10 determines that there are still spaces in the first cache block 121, the processing module 10 decodes the frames which need to be pre-decoded and saves the at least one frame of the second frame from the last to the N+1 frame from the last which are neither outputted nor saved to the second cache block 123 after pre-decoding. After saving the decoded frames to the second cache block 123, the processing module 10 outputs the frame with the latest time sequence in the first cache block 121 of the storage module 12 in the step S314. In the step S534, when the processing module 10 determines that the first cache block 121 is full of frames, the processing module 10 ignores the step of pre-decoding the frames which are neither outputted nor saved in the group of pictures 21, and outputs the decoded frames in the storage module 12 in the step S314.

The aforementioned steps are further explained with Table 2 hereinafter. When loading the frame P207, according to the aforementioned equation, the number of frames i which need to be pre-decoded is 2, and the frames I210 and P211 in the group of pictures 21 are pre-decoded at previous time. Therefore, at this time, the frames which need to be pre-decoded are the frames P212, P213 which are neither outputted nor saved in the group of pictures 21. Because the frame P213 is the frame which need to be saved in the storage module in the step S510, but the frames which need to be pre-decoded do not include the last frame among the frames which are neither outputted nor saved in the step S512, and there is still 1 decoded frame P216 in the first cache block 121 in the step S522. The processing module 10 decodes the frames which need to be pre-decoded and saves the frame P213 which need to be saved to the storage module 12 to the second cache block 123. The processing module 10 also outputs the decoded frame P216 with the latest time sequence in the storage module 12. The procedure of the method for reverse video playback after loading the frames P204 is identical to the procedure of loading the frame P207 and is not further explained hereinafter.

Similarly, the aforementioned steps are further explained with Table 2 hereinafter. When loading the frame P205, according to the aforementioned equation, the number of frames which need to be pre-decoded is 1, so the frame which needs to be pre-decoded is I210. However, the processing module 10 determines that the frame I210 is the frame which needs to be saved to the storage module 12, and the first cache block 121 of the storage module 12 is full of frames P213 and P214, so the processing module 10 ignores pre-decoding the frame I210 and outputs the frame P214 in the first cache block 121.

In the step S506, when the processing module 10 determines that the frames I210, P211, P212 . . . P21$i$ are all outputted or saved to the storage module 12, the processing module 10 outputs the decoded frame with the latest time sequence in the storage module 12. In Table 2, during loading the frame P202 and P201 of the method for reverse video playback, because the frame I210 and P211 in the group of pictures 21 are saved to the storage module 12 and the other frames in the group of pictures 21 are all outputted, the processing module 10 sequentially outputs the frame I210 and P211 in the storage module 12. In other words, the frame P211 is outputted when loading the frame P202, and the frame I210 is outputted when loading the frame P201.

It is worth mentioning that the frame number of the group of pictures 20 is not necessary the same as the frame number of the group of pictures 21 because the processing module 10 determines whether the frames in the group of pictures 21 are all outputted according to the step S402. When the frames in the group of picture 21 are not all outputted, even if all of the frames I200, P201, P202 . . . P20$j$ in the group of pictures 20 are loaded and saved to the queue, the processing module still outputs all of the frames I210, P211, P212 . . . P21$i$ in the group of pictures 21 preferentially according to the steps of the method for reverse video playback and then decodes the frames in the group of pictures 20.

It is also worth mentioning that when the frame number i which need to be pre-decoded is not an integer, that is, A is not divisible by (B+1) in the equation i=A/(B+1), rounding or ceiling is adopted to calculate the frame number i which need to be pre-decoded, wherein in the embodiment with Table 1, A stands for the number of frames which are neither outputted, saved, nor pre-decoded in the group of pictures 21, and B stands for the number of decoded frames saved in the storage module 12, and in the embodiment with Table 2, A stands for the number of frames which are neither outputted, saved, nor pre-decoded in the group of picture 21, and B stands for the number of decoded frames saved in the first cache block 121. In the present embodiment, ceiling is adopted when loading the frame P204. The embodiment is for illustrating but not for limiting the present invention.

In addition to the method for reverse video playback, a computer-readable medium having a computer program for a processing module to execute a plurality of instructions is provided, and the plurality of instructions are explained in the previous embodiments in detail and are not further described hereinafter.

The method for reverse video playback reduces and averages the latency time of outputting frames when playing the video backward by saving the pre-decoded frames of part of the video stream to the storage module and pre-decoding part of the frame when inputting a frame every time. Moreover, the method for reverse video playback further determines whether the frames in the group of pictures are all outputted through the processing module when decoding to solve the problem of having different frame numbers in different group of pictures within the same video stream.

TABLE 1

|  | Loading | Decoding process | Storage module | Output |
|---|---|---|---|---|
| group of picture 21 | $P_{2114}$ ... $P_{212}$ $P_{211}$ $I_{210}$ | $I_{210}$ $P_{211}$ $P_{212}$ $P_{213}$ $P_{214}$ $P_{215}$ $P_{216}$ $P_{217}$ $P_{218}$ $P_{219}$ $P_{2110}$ $P_{2111}$ $P_{2112}$ $P_{2113}$ $P_{2114}$ | $P_{2112}$ $P_{2113}$ | $P_{2114}$ |
| group of picture 20 | $P_{2014}$ | $I_{210}$ $P_{211}$ $P_{212}$ $P_{213}$ | $P_{2112}$ $P_{2113}$ | $P_{2113}$ |
|  | $P_{2013}$ | $P_{214}$ $P_{215}$ $P_{216}$ $P_{217}$ | $P_{2112}$ | $P_{2112}$ |
|  | $P_{2012}$ | $P_{218}$ $P_{219}$ $P_{2110}$ $P_{2111}$ | $P_{219}$ $P_{2110}$ | $P_{2111}$ |
|  | $P_{2011}$ | $I_{210}$ $P_{211}$ $P_{212}$ | $P_{219}$ $P_{2110}$ | $P_{2110}$ |
|  | $P_{2010}$ | $P_{213}$ $P_{214}$ $P_{215}$ | $P_{219}$ | $P_{219}$ |
|  | $P_{209}$ | $P_{216}$ $P_{217}$ $P_{218}$ | $P_{216}$ $P_{217}$ | $P_{218}$ |
|  | $P_{208}$ | $I_{210}$ $P_{211}$ | $P_{216}$ $P_{217}$ | $P_{217}$ |
|  | $P_{207}$ | $P_{212}$ $P_{213}$ | $P_{216}$ | $P_{216}$ |
|  | $P_{206}$ | $P_{214}$ $P_{215}$ | $P_{214}$ | $P_{215}$ |
|  | $P_{205}$ | $I_{210}$ $P_{211}$ | $P_{214}$ | $P_{214}$ |
|  | $P_{204}$ | $P_{212}$ $P_{213}$ | $P_{212}$ | $P_{213}$ |
|  | $P_{203}$ | $I_{210}$ | $P_{212}$ | $P_{212}$ |
|  | $P_{202}$ | $P_{211}$ |  | $P_{211}$ |
|  | $P_{201}$ | $I_{210}$ |  | $I_{210}$ |
|  | $I_{200}$ | $I_{200}$ $P_{201}$ $P_{202}$ $P_{203}$ $P_{204}$ $P_{205}$ $P_{206}$ $P_{207}$ $P_{208}$ $P_{209}$ $P_{210}$ $P_{211}$ $P_{212}$ $P_{213}$ $P_{214}$ | $P_{212}$ $P_{213}$ | $P_{214}$ |

TABLE 2

|  | Loading | Decoding process | First cache block | Second cache block | Output |
|---|---|---|---|---|---|
| group of picture 21 | $P_{2114}$ ... $P_{212}$ $P_{211}$ $I_{210}$ | $I_{210}$ $P_{211}$ $P_{212}$ $P_{213}$ $P_{214}$ $P_{215}$ $P_{216}$ $P_{217}$ $P_{218}$ $P_{219}$ $P_{2110}$ $P_{2111}$ $P_{2112}$ $P_{2113}$ $P_{2114}$ | $P_{2112}$ $P_{2113}$ |  | $P_{2114}$ |
| group of picture 20 | $P_{2014}$ | $I_{210}$ $P_{211}$ $P_{212}$ $P_{213}$ | $P_{2112}$ $P_{2113}$ |  | $P_{2113}$ |
|  | $P_{2013}$ | $P_{214}$ $P_{215}$ $P_{216}$ $P_{217}$ | $P_{2112}$ |  | $P_{2112}$ |
|  | $P_{2012}$ | $P_{218}$ $P_{219}$ $P_{2110}$ $P_{2111}$ | $P_{219}$ $P_{2110}$ |  | $P_{2111}$ |
|  | $P_{2011}$ | $I_{210}$ $P_{211}$ $P_{212}$ | $P_{219}$ $P_{2110}$ |  | $P_{2110}$ |
|  | $P_{2010}$ | $P_{213}$ $P_{214}$ $P_{215}$ | $P_{219}$ |  | $P_{219}$ |
|  | $P_{209}$ | $P_{216}$ $P_{217}$ $P_{218}$ | $P_{216}$ $P_{217}$ |  | $P_{218}$ |
|  | $P_{208}$ | $I_{210}$ $P_{211}$ | $P_{216}$ $P_{217}$ |  | $P_{217}$ |
|  | $P_{207}$ | $P_{212}$ $P_{213}$ | $P_{216}$ | $P_{213}$ | $P_{216}$ |
|  | $P_{206}$ | $P_{214}$ $P_{215}$ | $P_{213}$ $P_{214}$ |  | $P_{215}$ |
|  | $P_{205}$ |  | $P_{213}$ $P_{214}$ |  | $P_{214}$ |
|  | $P_{204}$ | $I_{210}$ | $P_{213}$ | $I_{210}$ | $P_{213}$ |
|  | $P_{203}$ | $P_{211}$ $P_{212}$ | $I_{210}$ $P_{211}$ |  | $P_{212}$ |
|  | $P_{202}$ |  | $I_{210}$ $P_{211}$ |  | $P_{211}$ |
|  | $P_{201}$ |  | $I_{210}$ |  | $I_{210}$ |
|  | $I_{200}$ | $I_{200}$ $P_{201}$ $P_{202}$ $P_{203}$ $P_{204}$ $P_{205}$ $P_{206}$ $P_{207}$ $P_{208}$ $P_{209}$ $P_{2010}$ $P_{2011}$ $P_{2012}$ $P_{2013}$ $P_{2014}$ | $P_{2012}$ $P_{2013}$ |  | $P_{2014}$ |

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A method for reverse video playback for playing a video stream backward, the video stream comprising a group of pictures, the group of pictures having a plurality of frames, the plurality of frames comprising an I-frame and at least one non-I-frame, the plurality of frames having a time sequence, the method for reverse video playback comprising:
   (a) decoding the frames from the I-frame to the last frame in the group of pictures according to the time sequence;
   (b) outputting the last decoded frame;
   (c) saving the last at least one decoded frame which is not outputted in the group of pictures to a storage module;

(d) pre-decoding the frame in the group of pictures, which is neither outputted nor saved in the storage module;
(e) outputting the decoded frame in the storage module; and
(f) when no decoded frame is in the storage module, outputting the last decoded frame which is neither outputted nor saved in the group of pictures which is pre-decoded and saving the last at least one decoded frame among the left frames to the storage module;
wherein the step of (d) further comprises:
calculating a frame number i which stands for a count of pre-decoded frames, wherein the value of i is calculated according the following equation:

$$i = \frac{A}{(B+1)}$$

wherein A stands for a count of frames in the group of pictures, which are neither outputted, saved in the storage module, nor pre-decoded, and B stands for a count of decoded frames saved in the storage module, and both A and B are natural numbers.

2. The method of claim 1, wherein the storage module comprises a first cache block and a second cache block for saving the decoded frames, and the total number of decoded frames saved in the first cache block and the second cache block is N, and in the step of (c), saving the decoded frames to the storage module is saving the decoded frames to the first cache block, and B is the number of the decoded frames saved in the first cache block, and N is an integer, and N is less than the number of frames of the plurality of frames, and B is less than or equal to N.

3. The method of claim 2, wherein when the i frames which need to be pre-decoded comprise the last frame which is neither outputted nor saved in the group of pictures, pre-decoding is executed and last decoded frame which is neither outputted nor saved in the group of pictures is outputted, and when the i frames which need to be pre-decoded do not comprise the last frame which is neither outputted nor saved in the group of pictures, pre-decoding is executed and the decoded frame in the storage module is outputted.

4. The method of claim 2, wherein when the number of the decoded frames in the first cache block is less than N and when the i frames which need to be pre-decoded comprise at least one frame of the second frame from the last to the N+1 frame from the last which are neither outputted nor saved in the group of pictures and does not comprise the last frame which is neither outputted nor saved in the group of pictures, pre-decoding is executed and at least one decoded frame of the second frame from the last to the N+1 frame from the last which are neither outputted nor saved is saved to the second cache block.

5. The method of claim 2, wherein when the number of the decoded frames in the first cache block is zero and when the i frames which need to be pre-decoded comprise at least one frame of the second frame from the last to the N+1 frame from the last which are neither outputted nor saved in the group of pictures and comprise the last frame which is neither outputted nor saved in the group of pictures, pre-decoding is executed and at least one decoded frame of the second frame from the last to the N+1 frame from the last which are neither outputted nor saved is saved to the first cache block.

6. The method of claim 5, wherein before saving the at least one decoded frame of the second frame from the last to the N+1 frame from the last which are neither outputted nor saved to the first cache block, the method further comprises moving the decoded frames temporarily saved in the second cache block to the first cache block.

7. The method of claim 2, wherein when the i frames which need to be pre-decoded comprises one frame of the last frame to the N frame from the last which are neither outputted nor saved in the group of pictures and when the storage module is full of decoded frames, the step of pre-decoding the i frames is ignored and the decoded frames in the storage module are outputted.

8. The method of claim 1, further comprising:
(g) repeating the step of (d) to (f) until the plurality of frames in the group of picture are outputted or saved in the storage module.

9. The method of claim 8, wherein before the step of (d) further comprises:
when the plurality of frames in the group of pictures are all outputted or saved to the storage module, outputting the decoded frames in the storage module.

10. A computer-readable non-transitory medium having a computer program for a processing module to execute a plurality of instructions to play a video stream backward, the video stream comprising a group of pictures, the group of pictures having a plurality of frames, the plurality of frames comprising an I-frame and at least one non-I-frame, the plurality of frames having a time sequence, the plurality of instructions comprising:
(a) decoding the frames from the I-frame to the last frame in the group of pictures according to the time sequence;
(b) outputting the last decoded frame;
(c) saving the last at least one decoded frame which is not outputted in the group of pictures to a storage module;
(d) pre-decoding the frame in the group of pictures, which is neither outputted nor saved in the storage module in the group of pictures;
(e) outputting the decoded frame in the storage module; and
(f) when no decoded frame is in the storage module, outputting the last decoded frame which is neither outputted nor saved in the group of pictures which is pre-decoded and saving the last at least one decoded frame among the left frames to the storage module;
wherein the step of (d) further comprises:
calculating a frame number i which stands for a count of pre-decoded frames, wherein the value of i is calculated according the following equation:

$$i = \frac{A}{(B+1)}$$

wherein A stands for a count of frames in the group of pictures, which are neither outputted, saved in the storage module, nor pre-decoded, and B stands for a count of decoded frames saved in the storage module, and both A and B are natural numbers.

11. The computer-readable non-transitory medium of claim 10, wherein the storage module comprises a first cache block and a second cache block for saving the decoded frames, and the total number of decoded frames saved in the first cache block and the second cache block is N, and in the step of (c), saving the decoded frames to the storage module is saving the decoded frames to the first cache block, and B is the number of the decoded frames saved in the first cache block, and N is an integer, and N is less than the number of frames of the plurality of frames, and B is less than or equal to N.

12. The computer-readable non-transitory medium of claim 11, wherein when the i frames which need to be pre-decoded comprise the last frame which is neither outputted nor saved in the group of pictures, pre-decoding is executed and last decoded frame which is neither outputted nor saved in the group of pictures is outputted, and when the i frames which need to be pre-decoded do not comprise the last frame which is neither outputted nor saved in the group of pictures, pre-decoding is executed and the decoded frame in the storage module is outputted.

13. The computer-readable non-transitory medium of claim 11, wherein when the number of the decoded frames in the first cache block is less than N and when the i frames which need to be pre-decoded comprise at least one frame of the second frame from the last to the N+1 frame from the last which are neither outputted nor saved in the group of pictures and does not comprise the last frame which is neither outputted nor saved in the group of pictures, pre-decoding is executed and at least one decoded frame of the second frame from the last to the N+1 frame from the last which are neither outputted nor saved is saved to the second cache block.

14. The computer-readable non-transitory medium of claim 11, wherein when the number of the decoded frames in the first cache block is zero and when the i frames which need to be pre-decoded comprise at least one frame of the second frame from the last to the N+1 frame from the last which are neither outputted nor saved in the group of pictures and comprise the last frame which is neither outputted nor saved in the group of pictures, pre-decoding is executed and at least one decoded frame of the second frame from the last to the N+1 frame from the last which are neither outputted nor saved is saved to the first cache block.

15. The computer-readable non-transitory medium of claim 14, wherein before saving the at least one decoded frame of the second frame from the last to the N+1 frame from the last which are neither outputted nor saved to the first cache block, the method further comprises moving the decoded frames temporarily saved in the second cache block to the first cache block.

16. The computer-readable non-transitory medium of claim 11, wherein when the i frames which need to be pre-decoded comprises one frame of the last frame to the N frame from the last which are neither outputted nor saved in the group of pictures and when the storage module is full of decoded frames, the step of pre-decoding the i frames is ignored and the decoded frames in the storage module are outputted.

17. The computer-readable non-transitory medium of claim 10, further comprising:
  (g) repeating the step of (d) to (f) until the plurality of frames in the group of picture are outputted or saved in the storage module.

18. The computer-readable non-transitory medium of claim 17, wherein before the step of (d) further comprises:
  when the plurality of frames in the group of pictures are all outputted or saved to the storage module, outputting the decoded frames in the storage module.

\* \* \* \* \*